June 9, 1959 J. F. REY 2,889,724
BORING, DRILLING AND TAPPING MACHINE
Filed Dec. 2, 1955 3 Sheets-Sheet 1

Inventor:
Jean François Rey
By: Michael S. Striker
agt.

June 9, 1959 J. F. REY 2,889,724
BORING, DRILLING AND TAPPING MACHINE
Filed Dec. 2, 1955 3 Sheets-Sheet 2
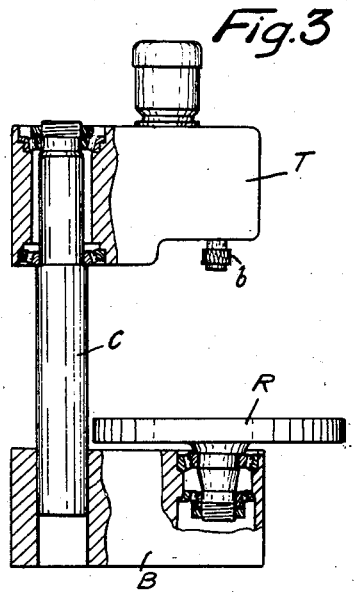
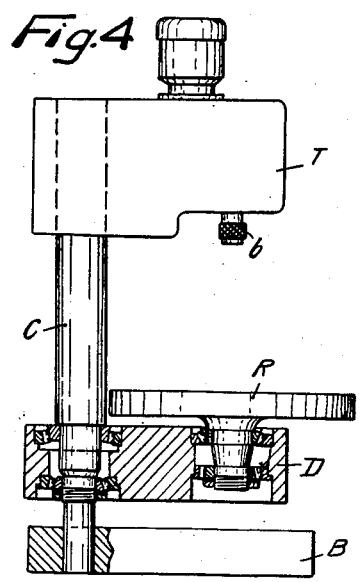
Inventor:
Jean François Rey
By: Michael S. Struker
agt June 9, 1959
J. F. REY
2,889,724
BORING, DRILLING AND TAPPING MACHINE
Filed Dec. 2, 1955
3 Sheets-Sheet 3
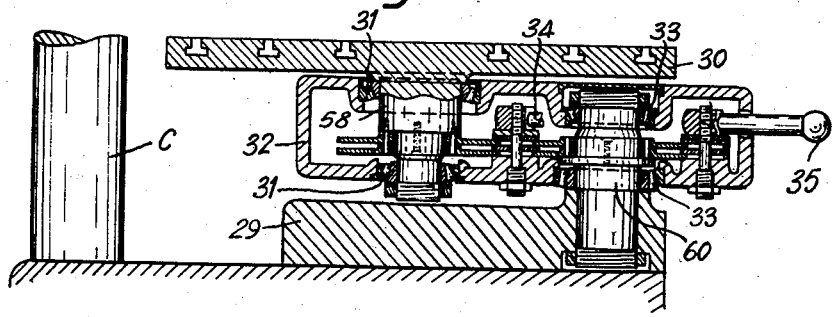
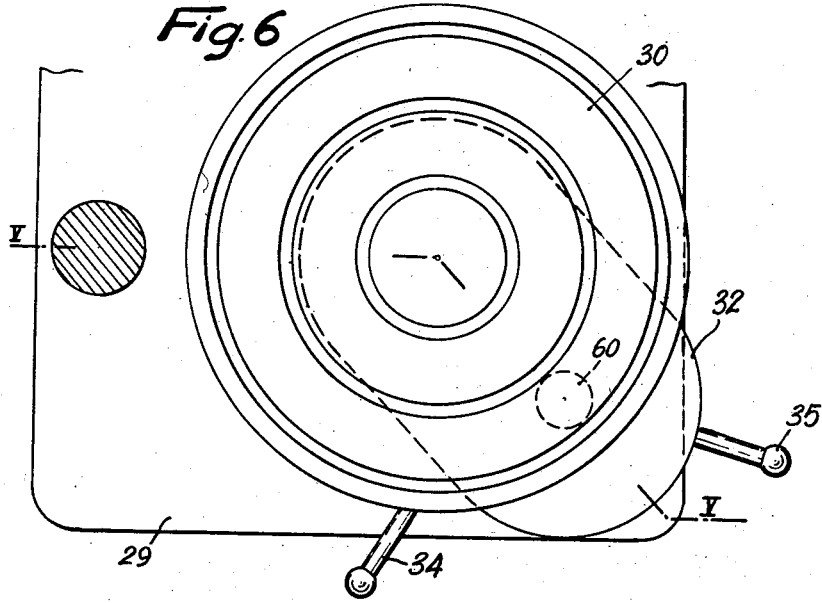
Inventor:
Jean François Rey
By: Michael S. Striker
agt.

2,889,724

BORING, DRILLING AND TAPPING MACHINE

Jean François Rey, Toulouse, France

Application December 2, 1955, Serial No. 550,710

Claims priority, application France December 6, 1954

4 Claims. (Cl. 77—28)

The different operations required for boring, drilling and tapping pieces of work secured to the bed of a machine tool are generally executed either on radial machines in which case the spindle-carrying head shiftably mounted on a sliding arm pivots round an upright or again on machines provided with a sensitive bed adapted to move in two different directions crossing each other. Now, the exploration of the surface of such pieces of work requires a considerable span since, taking in account the fact that the spindle cannot be brought within less than 100 mm. of the upright, the exploration of the surface of a disc of a diameter of 900 mm. requires a span of about 1 meter while, in the case of a machine carrying a bed adapted to move in two directions crossing each other, it is necessary for the axis of the spindle to be at 1 meter from the upright when it is desired to explore a disc having a diameter of 1 meter.

My invention has for its object to reduce substantially and by at least one half the overhanging of the spindle with reference to the upright of a machine of the types referred to.

My invention has more specifically for its object a boring, drilling and tapping machine including a bed adapted to assume a sensitive rotary movement round its axis in association with a locking system adapted to hold said bed fast in any suitable position, with the novel feature consisting in that one of its chief components, to wit the spindle-carrying head or the table support is also adapted to assume a sensitive rotary movement which has for its result to make the spindle describe an arc of a circumference passing through the axis of rotation of the bed and sweep for each complete revolution of the bed, over the entire surface of the bed, said component being further associated with a corresponding locking system adapted to brake preferably both the rotary movement of said component and that of the bed.

As a consequence of the combination of these two sensitive movements, it is possible to scan or explore the entire surface of the machine bed by locating the axis of the spindle-carrying head in a manner such that it registers or is adapted to register with the axis of rotation of the bed.

This arrangement allows also exploring rectangular surfaces extending beyond the bed surface.

The pivots for the two rotary movements being mounted in roller bearings, the frictional coefficients are reduced to a minimum and an easy displacement is provided, which is of considerable interest when it is desired to bore several holes in a same piece of work and chiefly when it is desired to resort to a gauge with positioning means defined by the sleeves adapted to guide the boring bit, the most favorable modus operandi consisting in inserting the boring bit inside a sleeve while the two rotary movements are allowed so as to obtain exactly the desired positioning before locking the rotary parts.

The possibility of locking either simultaneously the sensitive movement of the bed and the complementary sensitive movement or only the latter furthers considerably the machining operation.

According to yet another feature of my invention, the systems locking the two sensitive movements act independently of the roller bearings carrying the rotary parts, which, in association with the cutting out of all clearances obtained by the fitting of the rotary parts in roller bearings with play compensating means, allows retaining after locking the adjusted positioning of the parts.

I have disclosed hereinafter by way of example a number of embodiments of my invention which are illustrated in accompanying drawings wherein:

Fig. 3 is a diagrammatic view of a machine with a sliding spindle mounted on a head assuming a sensitive rotary movement with reference to an upright which is adjustable as to height with reference to a carrier frame.

Fig. 4 is a diagrammatic view of a machine provided with a sliding spindle mounted on a head the level of which is adjustable with reference to an upright round which the bed support revolves during its sensitive rotary movement.

Fig. 5 is a cross-sectional view, through line V—V of Fig. 6 of a bed adapted to assume two sensitive rotary movements.

Fig. 6 is a plan view of last mentioned bed and support.

Figure 1:
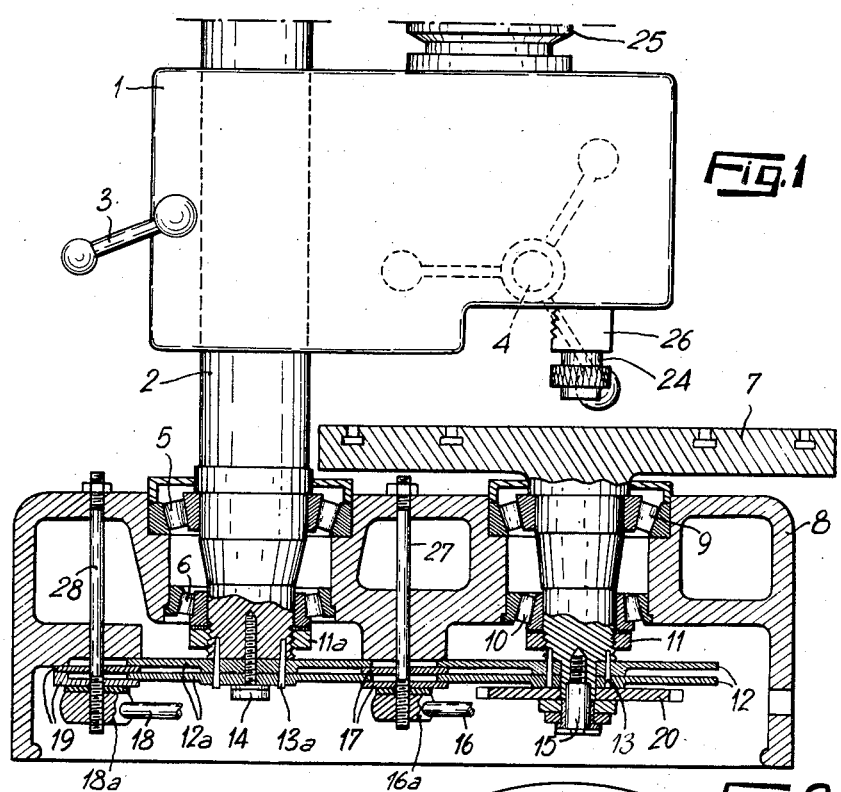
Fig. 1 is a view partly in vertical cross-section and partly in elevation of a first embodiment of a machine according to my invention.
Figure 2:
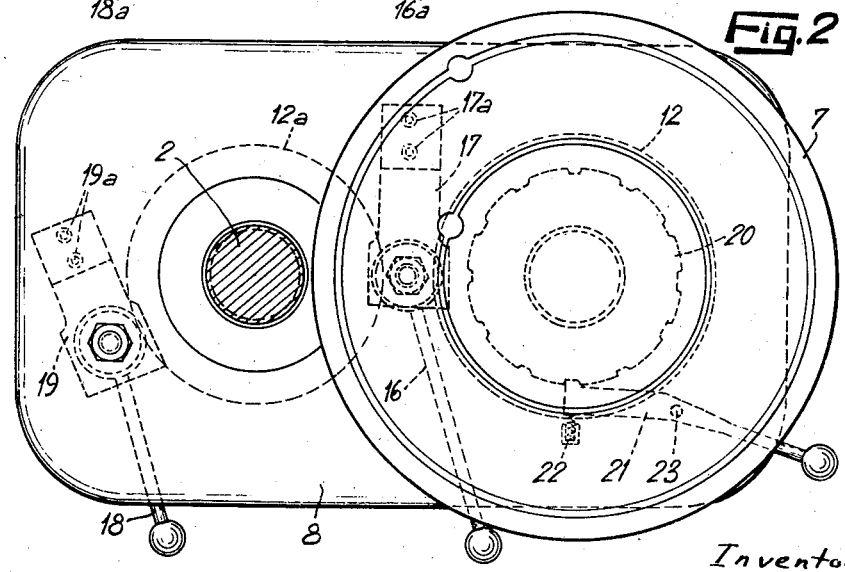
Fig. 2 is a plan view of the lower section of said machine together with a dividing device adapted to be mounted on said machine.

Turning to Figs. 1 and 2, the head 1 carrying the spindle is adapted to move in a conventional manner over the upright 2 and to be locked by the handle 3 in any desired position.

The spindle 24 is driven into rotation by the motor 25 through the agency of any known means which are not illustrated and need not be described since they form no part of the invention.

The sliding of the spindle-carrying sleeve or quill 26 is obtained through a three-arm capstan 4 as provided through the agency of a pinion meshing with a rack cut longitudinally of the sleeve 26. It is possible to incorporate into said arrangement a suitable automatic feed.

The lower end of the upright 2 is carried in roller bearings 5 and 6 in which any play or clearance is compensated for through the nut 11a so as to ensure an accurate and sensitive rotation of the upright 2 carrying the head 1.

The bed 7 is mounted on the frame 8 through the agency of roller bearings 9 and 10 also adjusted by a play compensating nut 11 so that the bed 7 may revolve without any clearance.

The bed 7 and the upright 2 are each coaxially rigid as illustrated with two discs 12 and 12a respectively which are held in position by the pin 13a and the screw 14 in the case of the discs 12 and by the pin 13 and the screw 15 in the case of the discs 12a.

Two yielding braking plates 17 secured at 17a to the frame are mounted through their edges between or close to the corresponding edges on one hand of the two discs 12 and on the other hand of the two discs 12a. These braking plates are perforated to provide for the passage therethrough of the vertical rod 27 carried by the frame and the lower threaded end of which is screwed into a nut 16a rigid with a control handle 16.

Similarly, between or close to the edges of the superposed discs 12a and at a point remote from the discs 12 there are fitted the edges of two superposed yielding braking plates secured at 19a to the frame. Through said plates, there extends a vertical rod 28 carried by the frame and on the lower threaded end of which is screwed a nut 18a rigid with a handle 18.

The operation of the handle 16 allows obtaining, through the agency of the plates 17 braking the two pairs of discs, the simultaneous locking and unlocking of the upright 2 and of the bed 7 while the handle 18 controls through the agency of the braking plates 19 similar to the plates 17 the locking and unlocking of the upright 2 alone.

It is possible to provide the machine with a dividing device constituted in any desired manner or as illustrated by means of a notched subdivided plate 20 associated with a rocking bolt 21 held in its operative notch-engaging position by a spring 22.

By releasing the rocking bolt 21 to make it rock round its pivot 23, it is possible to make the bed 7 turn wherethrough any desired notch in the plate 20 may be brought into register with the bolt 21.

The machine described hereinabove may be used for mass production requiring the use of a rotary bed controlled by hand as in the case illustrated or controlled automatically through the agency of suitable means associated operatively with the rising and sinking movement of the spindle.

In the modification illustrated in Fig. 3, the head T and the bed R are mounted so as to be capable of sensitive rotary movements with the possibility of locking simultaneously or otherwise these two rotary movements, this being provided in any suitable manner while the upright C is vertically adjustable with reference to the carrier frame B and the spindle b is slidingly carried by the head T.

In the modification illustrated in Fig. 4, the head T is vertically adjustable over the upright C, the spindle b is mounted slidingly in the head, the support D for the bed R is mounted so as to assume a sensitive rotary movement with said bed round the upright C which is rigidly secured to the supporting frame B, and means are provided for locking simultaneously or otherwise the two rotary movements.

It is also possible as illustrated in Figs. 5 and 6 to provide a sensitive bed adapted to assume a compound rotary movement and mounted on a support 29 constituted by the actual frame of the machine or else by any independent support adapted to be fitted for instance on a boring machine of any suitable type.

The actual circular bed 30 is mounted so as to be capable of assuming a primary rotary sensitive movement through the agency of the roller bearings 31 on an intermediate member 32 adapted to assume a secondary rotary sensitive movement over the roller bearings 33, with reference to the support 29. It will be readily ascertained that an arrangement similar to that disclosed with reference to Fig. 1 allows locking only one of the rotary movements through the handle 35 or else both movements through the handle 34.

The boring, drilling or tapping machine including a bed adapted to assume a double sensitive movement according to my invention, shows considerable technical advantages with reference to the radial machines used hitherto and also with reference to the machines having a sensitive table adapted to assume two directions of movement crossing each other.

As a matter of fact, since the axis of the spindle may be located in alignment with the axis of rotation of the rotary bed, it is possible to explore the complete surface of said bed. If the spindle axis is located at 500 mm. from the upright, it is possible to scan or explore therewith the total surface of a disc having a diameter of 1 meter.

Furthermore, the pivots of the two rotary movements being mounted in roller bearings and the locking being independent with reference to the guiding of the pivots, it is possible to obtain an easy displacement and furthermore the positionings do not vary at the moment of the locking of the moving parts.

It will be ascertained also that for mass production it is possible to proceed simultaneously with the boring, drilling or tapping with a number of spindles engaging pieces of work secured to one half of the bed while other pieces of work are being positioned or mounted on the other half of the table.

What I claim is:

1. In a machine tool, in combination a support; work tool means and work carrying means, each of said means being mounted on said support for turning movement relative thereto about substantially parallel turning axes, respectively, so that the angular position of each of said means relative to said support may be varied; and braking means operatively associated with both of said means for preventing turning movement thereof relative to said support whenever desired, said braking means including a braking element mounted on said support in such a manner as to be incapable of turning about an axis coextensive with said turning axes and having a braking portion adapted to be moved in a direction parallel to said turning axes into braking engagement with both of said means, and moving means for moving said braking portion of said braking element in said direction into braking engagement with both of said means whenever desired.

2. In a machine tool, in combination, a support; work tool means and work carrying means, each of said means being mounted on said support for turning movement relative thereto about substantially parallel turning axes, respectively, so that the angular position of each of said means relative to said support may be varied; first braking means operatively associated with both of said means for preventing turning movement thereof relative to said support whenever desired, said first braking means including a first braking element mounted on said support in such a manner as to be incapable of turning about said turning axes and having a first braking portion adapted to be moved in a direction parallel to said turning axes into braking engagement with both of said means, and first moving means for moving said first braking portion of said first braking element in said direction into braking engagement with both of said means whenever desired; and second braking means operatively associated with one of said means and independent of the other of said means for preventing turning movement of said one means relative to said support whenever desired, said second braking means including a second braking element mounted on said support in such a manner as to be incapable of turning about the turning axis of said one means and having a second braking portion adapted to be moved in a direction parallel to the last-mentioned turning axis into braking engagement with said one means, and second moving means for moving said second braking portion of said second braking element in said direction into braking engagement with said one means whenever desired.

3. In a machine tool, in combination, a support; a carrier mounted on said support for turning movement relative thereto about a first turning axis so that the angular position of said carrier relative to said support may be varied; a work table mounted on said carrier for turning movement relative thereto about a second turning axis substantially parallel to said first turning axis so that the angular position of said work table relative to said carrier may be varied; and braking means operatively associated with said carrier and said work table for preventing turning movement thereof about their respective turning axes whenever desired, said braking means including a braking element mounted in such a manner as to be incapable of turning about said turning axes and having a braking portion adapted to be moved in a direction parallel to said turning axes into braking engagement with both said carrier and said work table, and moving means for moving said braking portion of said braking element in said direction into braking engagement with both said carrier and said work table.

4. In a machine tool, in combination, a support; a carrier mounted on said support for turning movement relative thereto about a first turning axis so that the angular position of said carrier relative to said support may be varied; a work table mounted on said carrier for turning movement relative thereto about a second turning axis substantially parallel to said first turning axis so that the angular position of said work table relative to said carrier may be varied; first braking means operatively associated with said carrier and said work table for preventing turning movement thereof about their respective turning axes whenever desired, said first braking means including a first braking element mounted in such a manner as to be incapable of turning about said turning axes and having a first braking portion adapted to be moved in a direction parallel to said turning axes into braking engagement with both said carrier and said work table, and first moving means for moving said first braking portion of said first braking element in said direction into braking engagement with both said carrier and said work table; and second braking means operatively associated with said carrier for preventing turning movement thereof about its turning axis whenever desired, said second braking means including a second braking element mounted in such a manner as to be incapable of turning about said first turning axis and having a second braking portion adapted to be moved in a direction parallel to said first turning axis into braking engagement with said one means, and second moving means for moving said second braking portion of said second braking element in said direction into braking engagement with said carrier whenever desired.

References Cited in the file of this patent

UNITED STATES PATENTS

| Number | Name | Date |
|---|---|---|
| Re. 20,906 | Trosch | Nov. 1, 1938 |
| 69,533 | Bishop | Oct. 8, 1867 |
| 1,278,407 | Werth | Sept. 10, 1918 |
| 1,290,382 | Slaughter | Jan. 7, 1919 |
| 2,369,425 | Becker | Feb. 13, 1945 |
| 2,433,794 | Sprigman | Dec. 30, 1947 |
| 2,629,268 | Budney | Feb. 24, 1953 |